United States Patent
Tiwary et al.

(10) Patent No.: US 10,135,896 B1
(45) Date of Patent: Nov. 20, 2018

(54) SYSTEMS AND METHODS PROVIDING METADATA FOR MEDIA STREAMING

(71) Applicant: AMAZON TECHNOLOGIES, INC., Reno, NV (US)

(72) Inventors: Shinjan Kumar Tiwary, Sunnyvale, CA (US); Sreeram Raju Chakrovorthy, Campbell, CA (US); Sapna Jayaram Rai, Campbell, CA (US)

(73) Assignee: AMAZON TECHNOLOGIES, INC., Reno, NV (US)

( * ) Notice: Subject to any disclaimer, the term of this patent is extended or adjusted under 35 U.S.C. 154(b) by 470 days.

(21) Appl. No.: 14/187,768

(22) Filed: Feb. 24, 2014

(51) Int. Cl.
*H04L 29/06* (2006.01)

(52) U.S. Cl.
CPC ................ *H04L 65/602* (2013.01)

(58) Field of Classification Search
CPC ... H04L 65/80; H04L 29/06027; H04L 47/24; H04L 65/1083; H04L 65/4084; H04L 65/602; H04L 65/605; H04L 65/607; H04L 67/02; H04L 65/60; H04L 29/08072; H04L 29/06; H04L 29/0809; H04L 29/08117; H04N 21/21; H04N 21/23; H04N 21/23439; H04N 21/4122; H04N 21/4143; G06Q 30/02
USPC ........ 709/219, 231, 214, 232, 245; 375/240; 725/219
See application file for complete search history.

(56) References Cited

U.S. PATENT DOCUMENTS

| | | | | |
|---|---|---|---|---|
| 9,619,825 | B1 * | 4/2017 | Albert | G06Q 30/0269 |
| 2001/0047517 | A1 * | 11/2001 | Christopoulos | G06T 1/00 725/87 |
| 2002/0091840 | A1 * | 7/2002 | Pulier | H04L 65/1083 709/228 |
| 2002/0120721 | A1 * | 8/2002 | Eilers | G06F 17/30905 709/220 |
| 2003/0046704 | A1 * | 3/2003 | Laksono | H04N 7/17336 725/96 |
| 2003/0115282 | A1 * | 6/2003 | Rose | H04L 29/06 709/214 |
| 2004/0086193 | A1 * | 5/2004 | Kameyama | G06T 3/4053 382/254 |
| 2004/0236826 | A1 * | 11/2004 | Harville | H04L 29/06027 709/203 |
| 2004/0267954 | A1 * | 12/2004 | Shen | G06F 12/0875 709/231 |
| 2005/0076136 | A1 * | 4/2005 | Cho | H04L 29/06027 709/231 |
| 2005/0079848 | A1 * | 4/2005 | Aromaa | H04B 1/1036 455/296 |
| 2006/0193295 | A1 * | 8/2006 | White | H04L 12/5692 370/336 |
| 2007/0186254 | A1 * | 8/2007 | Tsutsui | G06Q 30/02 725/87 |

(Continued)

*Primary Examiner* — David R Lazaro
*Assistant Examiner* — Berhanu Shitayewoldetadik
(74) *Attorney, Agent, or Firm* — Lindauer Law, PLLC

(57) ABSTRACT

Media devices streaming video from a server may use techniques to maintain presentation of content to one or more users. Described herein are systems and methods for determining which metadata to provide to the media devices for maintaining presentation of the content. The determination of which metadata to provide may be based on various factors such as the capabilities of the media device, the expected quality of service, and the amount of bandwidth between the server and the media device.

20 Claims, 9 Drawing Sheets

(56) References Cited

U.S. PATENT DOCUMENTS

| | | | | |
|---|---|---|---|---|
| 2007/0204314 A1* | 8/2007 | Hasek | H04N 7/17309 | 725/100 |
| 2009/0064221 A1* | 3/2009 | Stevens | H04N 5/50 | 725/38 |
| 2009/0182889 A1* | 7/2009 | Hurst | H04N 21/4325 | 709/231 |
| 2009/0193457 A1* | 7/2009 | Conn | G06Q 30/0241 | 725/34 |
| 2009/0307368 A1* | 12/2009 | Sriram | H04N 21/23406 | 709/231 |
| 2010/0053424 A1* | 3/2010 | Kobayashi | H04N 7/013 | 348/441 |
| 2010/0135379 A1* | 6/2010 | Fortin | H04N 19/597 | 375/240.01 |
| 2011/0252155 A1* | 10/2011 | Parekh | H04N 21/23406 | 709/231 |
| 2011/0282745 A1* | 11/2011 | Meoded | G06Q 30/0264 | 705/14.61 |
| 2012/0084860 A1* | 4/2012 | Cao | H04L 63/1441 | 726/23 |
| 2012/0147265 A1* | 6/2012 | Gu | H04N 5/4403 | 348/473 |
| 2012/0204201 A1* | 8/2012 | Cassidy | H04N 21/258 | 725/10 |
| 2013/0013704 A1* | 1/2013 | Pope | H04L 61/1541 | 709/206 |
| 2013/0064287 A1* | 3/2013 | Karlsson | H04N 19/46 | 375/240.02 |
| 2013/0071087 A1* | 3/2013 | Motiwala | H04N 21/8455 | 386/241 |
| 2013/0081084 A1* | 3/2013 | Scheer | H04N 21/2408 | 725/46 |
| 2013/0222539 A1* | 8/2013 | Pahalawatta | H04N 19/597 | 348/43 |
| 2013/0308919 A1* | 11/2013 | Shaw | H04N 21/2221 | 386/239 |
| 2013/0347026 A1* | 12/2013 | Reisman | G11B 27/034 | 725/25 |
| 2014/0013344 A1* | 1/2014 | Taxier | H04N 21/43 | 725/10 |
| 2014/0122739 A1* | 5/2014 | Thang | H04L 65/4084 | 709/231 |

* cited by examiner

SYSTEMS AND METHODS PROVIDING METADATA FOR MEDIA STREAMING

BACKGROUND

A wide variety of content is available for streaming to media devices for presentation. The content may include audio, video, or both. The media devices may include televisions, set-top boxes, tablet computers, personal computers, gaming consoles, in-vehicle entertainment systems, portable media players, and so forth.

Traditionally, changing conditions, missing or corrupt frames, and so forth may result in "stutters" or other problems associated with presentation of the content. These problems may result in an undesirable user experience.

Figure 1:
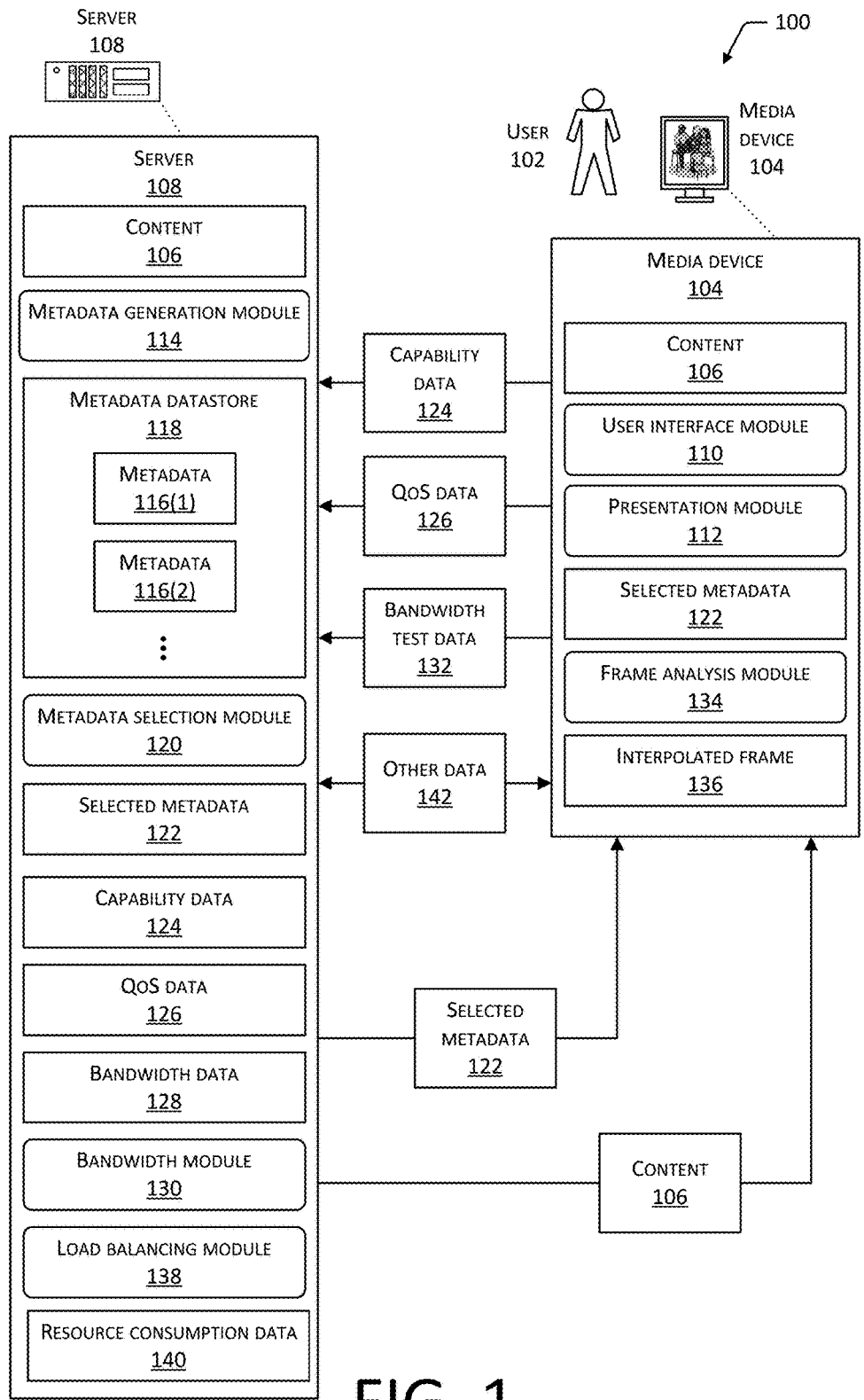
FIG. 1 is an illustrative system configured to provide metadata based on bandwidth, requested quality of service, and media device capabilities.

Certain implementations and embodiments will now be described more fully below with reference to the accompanying figures, in which various aspects are shown. However, various aspects may be implemented in many different forms and should not be construed as limited to the implementations set forth herein. Like numbers refer to like elements throughout.

DETAILED DESCRIPTION

Servers may stream content to media devices. The content may include audio, video, or both. For example, the content may include television shows, movies, audio books, and so forth. Streaming comprises an incremental ongoing transmission of portions of the content. As portions are received, presentation may take place. Streaming allows for presentation to begin before the entire file has been downloaded. Streaming offers several advantages compared to local storage of the entire file of the content. Local storage requirements of the media device are reduced, lowering costs associated with the device. Content publishers or owners may be better able to determine content consumption statistics such as how many times a movie has been watched. Digital rights management may also be more easily applied and updated, helping to maintain intellectual property rights in the content.

Streaming utilizes a connection to the one or more servers to receive portions of the content for presentation. The connection between the media device and the one or more servers may use one or more networks. Data transfer rate (or "bandwidth") between the media device and the one or more servers may change from time to time. These changes in bandwidth may result from changes in network routing, congestion at one or more points along the network, and so forth. For example, the bandwidth may be 1.5 megabits per seconds ("Mbps") at time=0, drop to 0.75 Mbps at time=1, and increase to 1.6 Mbps at time=2. "Bit" or "bits" as used in this disclosure are indicative of a quantity of data transferred, stored, or otherwise manipulated for ease of discussion and not as a limitation. For example, the quantity of data may be expressed as bytes.

Video content may comprise a plurality of frames. A display output device presents these frames in sequence to produce apparent motion. Frame rates of 15 frames per second or more may be used to provide video. For example, a frame rate of 60 frames per second ("fps") presents 60 frames in sequence for every second, with each frame presented on the display output device for about 1/60 of a second, or about 16.6 milliseconds ("ms").

For presentation of the video content to be maintained without dropouts, stutters, or other presentation anomalies, the frames are delivered to the media device, and ultimately the display output device, without interruption. Various situations may result in dropouts, such as changes in bandwidth, corrupt data resulting in unusable frames, delays in delivery of frames, and so forth.

To maintain presentation, the media device may buffer a portion of the streamed content. For example, the video frames received from the one or more servers are stored in memory. Presentation may then use the buffered video frames. Over time, the buffer is refilled with additional video frames received from the one or more servers. Without this refill, the buffer is exhausted and presentation is starved for video frames to present.

The one or more servers may use techniques such as adaptive bitrate streaming ("ABS") to mitigate problems associated with changing bandwidth. ABS responds to changes in the bandwidth by transitioning between different versions of the content based on the bandwidth available. Each of these different versions may provide content of different quality. In one implementation, the different versions of the content may include a low quality low bitrate stream, a medium quality medium bitrate stream, and a high quality high bitrate stream.

ABS may attempt to estimate future bandwidth, and adjust the quality or resolution of the content delivered to the media device to fit this estimation. Typically these estimations are pessimistic, which may result in unnecessary transitions to lower quality streams of the content. Furthermore, transitions from one quality of content to another may result in stutter or dropout. For example, a transition from video encoded at a high quality (such as a bitrate of 2400 Kbps) to video encoded at a low quality (such as a bitrate of 500 Kbps) may result in a momentary interruption of the video presented to the user by the media device as frames associated with the low quality are stored in the buffer.

Other situations may result in stutters or other presentation anomalies. For example, video frames may be delivered late, that is, after the appropriate time for presentation has passed. In another example, video frames may be corrupt or unusable. In traditional systems, unavailable frames, such as frames which have not yet been delivered, frames which are corrupt or otherwise unusable, and so forth, may result in stutters. For example, frames may not yet have been delivered due to a transition from one quality of a stream to another, resulting in a stutter. This results in an undesirable user experience, interrupting the user's consumption of the content.

Video may be encoded using independent frames and dependent frames. Independent frames comprise information configured to present an image without reference to another frame. In comparison, dependent frames comprise information configured to present an image based on another frame, such as an independent frame, another dependent frame, and so forth. The use of independent and dependent frames may reduce the bandwidth required to deliver the video content, relative to "raw" or uncompressed data.

In one implementation, video may be encoded using the MPEG-2 standard promulgated by the Motion Pictures Experts Group ("MPEG") or the H.264 standard developed by the Video Coding Experts Group ("VCEG") and the MPEG. In these standards, "intra frames" or "I-frames" are independent frames, while "P frames" and "B frames" are dependent frames.

A first interpolation implementation provides for out-of-sequence advance delivery of independent frames. In this implementation a first independent frame is delivered, followed by or contemporaneously with, a second or future independent frame. For example, the second independent frame may be delivered contemporaneously with the dependent frames associated with the first independent frame. Should frames between the first independent frame and the second independent frame be unavailable, a frame interpolation module on the media device may generate interpolated frames for use. These interpolated frames may be based on the previously received dependent frames as well as the second independent frame.

Described in this disclosure are techniques for providing metadata to the media device for maintaining presentation of video content. As described in more detail below, the server may select certain metadata to provide to the media device based on various factors such as the capabilities of the media device, the requested quality of service ("QoS"), the bandwidth between the server and the media device, and so forth.

In some implementations, the server generates the metadata. In other implementations, another computing device generates the metadata, and the server accesses the already generated metadata. The metadata may comprise information about the content. For example, the metadata may specify frame size in bits for a particular video frame. The media device may be configured to use the metadata for maintaining presentation of the video content. For example, the media device may employ an interpolation technique, generating interpolated frames that the media device may use to reduce the incidence of stutters, dropouts, or other presentation anomalies. This reduction may improve the user experience while consuming streaming content, particularly in situations where the bandwidth between the media device and the server varies or is of uncertain quality.

A metadata datastore may store different types of metadata. As discussed in more detail below, the different types of metadata may include frame size data, motion vector data, quantization data, transformation data, and so forth.

The server may determine which metadata to send to the media device based on various factors. The server may provide certain metadata based on bandwidth data. The bandwidth data may indicate an amount of bandwidth between the server and the media device. In some examples, the server selects certain metadata in response to the amount of bandwidth being equal to or greater than a first threshold amount.

The server may provide certain metadata based on QoS data. The QoS data may represent a requested QoS associated with video streamed by the media device. For example, a user of the media device may select a button requesting for the media device to present the video content in 720p or 1080p. For the 720p picture quality, the server may provide a first set of metadata, and for the 1080p picture quality, the server may provide a second set of metadata.

The server may provide certain metadata based on capability data. The capability data may indicate one or more capabilities of the media device. The capabilities may indicate whether the media device may use a particular type of metadata. In one example, the capability data may indicate that the media device may present video content that is compatible with the MPEG-2 standard or the H.264 standard. Because the capability data indicates this information, the server may determine to provide first metadata to the media device, and may determine to not provide second metadata to the media device. In another example, the capability data may indicate other information about the media device such as the make, model, the location, the media device browser, and so forth. The server may select metadata based on this other information.

The server may provide certain metadata based on priority data. The priority data may indicate a value used to rank the metadata. In one example, a first metadata is associated with a first priority indicating a value of one, and a second metadata is associated with a second priority indicating a value of four. In this example, the value of one is ranked as the highest value while number ten is ranked as the lowest value. Because the first metadata is associated with a priority value that is higher than the priority value associated with the second metadata, the server may determine to provide the first metadata before providing the second metadata. Prioritizing the metadata may result in a more optimized server. Optimizing the server may be described as causing the server to operate in a more cost effective manner. The cost effective manner may be described as being economical or efficient in terms of services received from money spent.

The priority values associated with the metadata may be determined based on various factors. For example, the priority value associated with a particular metadata may be determined based on the amount of bandwidth between the server and the media device. In one example, the server associates a first value to the particular metadata if the amount of bandwidth is equal to or more than a threshold amount. In another example, the server may associate priority values to the metadata based on the capability data. A first media device may indicate that the media device is not compatible with a certain type of metadata. Accordingly, the server may cause a priority value to be associated with the certain type of metadata, causing that type of metadata to not be provided to the media device.

In some implementations, the priority values associated with the metadata is determined based on the amount of resources consumed to generate the metadata. For example, the generation of a first type of metadata may consume a first amount of resources, and the generation of a second type of metadata may consume a second, higher amount of resources. The server may assign a higher priority value to the first type of metadata when compared to the second type of metadata because the generation of the first type of metadata may consume fewer resources than the generation of the second metadata.

The server may be configured to determine when to provide the metadata to the media device. In some implementations, the server determines when to provide the metadata to the media device based on resource consumption data. The resource consumption data may indicate an amount of resources being consumed by the server. The resources may include hardware resources such as memory, processor, disk, and so forth. Once the amount of resources is equal to or more than a threshold amount, the server may stop providing content to the media devices, and start providing certain metadata to the media devices. Providing content may consume a relatively large amount of resources when compared to providing the metadata. If too many resources are consumed, the server may overload. The media devices may use the metadata to continue to present video content to the user. By terminating the transmission of the content and providing the metadata, the amount of overloads occurring at the server may be reduced or eliminated.

Illustrative System

FIG. 1 is an illustrative system 100 configured to provide metadata based on bandwidth, requested QoS, and media device capabilities. A user 102 is depicted with a corresponding media device 104 to present content 106 for consumption. While a single user 102 and a single media device 104 is shown, more than one user 102 may consume the content 106 at a given time, such as where multiple users 102 are watching the content 106 together.

The media devices 104 may include televisions, tablet computers, personal computers, set-top boxes, gaming consoles, in-vehicle entertainment systems, portable media players, and so forth. The media device 104 includes or is communicatively coupled to one or more display output devices suitable for presenting video. As discussed in more detail below with regard to FIG. 2, the content 106 may include thumbnails, video frames, audio frames, and other information. The content 106 may be compatible with at least a portion of the MPEG-2 standard promulgated by the Motion Pictures Experts Group ("MPEG") or the H.264 standard developed by the Video Coding Experts Group and the MPEG, wherein the selected metadata is provided to the media device 104 separate from the content 106.

The media device 104 may be coupled to a remote control using a communication link. The remote control may serve as an input device or input/output device for the media device 104. For example, the remote control may include one or more of a touch sensor, button, accelerometer, gyroscope, camera, microphone, speaker, haptic output device, and so forth. The communication link may be optical, radio frequency, acoustic, and so forth. In one implementation the communication link may use a personal area network interface, such as one compliant with the Bluetooth® specification. In some implementations, the remote control may comprise another device such as a smartphone, tablet computer, and so forth which is communicatively coupled to the media device 104.

The media device 104 may receive content 106 streamed over one or more networks (not shown) from one or more servers 108. The one or more networks may include one or more public networks such as the Internet, private networks, or a combination of both. The network in turn couples to a plurality of servers 108(1), 108(2), . . . , 108(S). As used in this disclosure, a letter within parenthesis such as "(S)" represents an integer value greater than zero. While a single server 108 is depicted, in some implementations the server 108 or the functions attributed to the server 108 may be provided by a plurality of devices. For example, the server 108 may exist as a virtualized server executing across a plurality of physical servers.

The media device 104 may include a user interface module 110 configured to provide a user interface to the user 102 and accept inputs responsive to the user interface. The user interface may include one or more visual, audible, or haptic elements. For example, the user interface may be configured to provide a graphical user interface using the display which includes a control to navigate within the content 106.

The media device 104 may include a presentation module 112 configured to present content 106 on, or in conjunction with, the media device 104. The presentation module 112 may be configured to receive streamed content 106 from an external source device such as the server 108, another media device 104, and so forth. The presentation module 112 may support digital rights management, presentation of encrypted content, and so forth. The presentation module 112 may be configured to work in conjunction with the user interface module 110 to allow the user 102 to control presentation of the content 106.

The server 108 may provide functions such as streaming content 106 to the media device 104 for presentation, authenticating user accounts, providing content lists, and so forth. The server 108 may store, or have access to, one or more pieces of content 106. The content 106 may be provided using the network to the media device 104.

The server 108 may include a metadata generation module 114 configured to generate metadata 116. The metadata 116 may comprise information about the content 106. For example, the metadata 116 may specify frame size in bits for a particular video frame. The metadata 116 may be embedded or encoded in the video frame, stored as a separate file, and so forth. The metadata 116 may be stored in a metadata datastore 118. The metadata datastore 118 may comprise a data structure which is stored on one or more memory devices.

The metadata generation module 114 may generate the metadata 116 based on real time or near real time heuristics associated with the communication between the server 108 and the media device 104. In one example, near real time may be a period of time less than or equal to twenty seconds. Generating the metadata 116 in near real time may be described as generating the metadata 116 substantially immediately once the server 108 determines certain values (e.g., the amount of bandwidth) associated with the communication between the server 108 and the media device 104. In some examples, substantially immediately may be described as within a designated period of time, such as five seconds.

The metadata generation module 114 may generate the metadata 116 based the type of content 106. For example, the metadata generation module 114 may generate first metadata 116(1) for a first type of content 106, and second metadata 116(2) for a second, different type of content 106.

The media device 104 may be configured to use certain metadata 116 to maintain the presentation of video content in response to conditions affecting the streaming of content. One or more conditions on the server 108, the media device 104, the network, and so forth may affect the streaming of the content 106. For example, data congestion on the network may impact a data transfer rate of portions of the content 106, such as video frames.

The metadata 116 may be associated with priority information that may include a number or value. The priority information may be used by the server 108 to determine which metadata 116 to include in selected metadata 122. The metadata 116 is discussed in more detail with regard to FIG. 2.

The server 108 may include a metadata selection module 120 configured to select certain metadata 116. The metadata 116 that is selected by the metadata selection module 120 may comprise selected metadata 122. The selected metadata 122 may comprise different metadata 116. For example, the selected metadata 122 may comprise at least the metadata 116(1), the metadata 116(2), and so forth.

The metadata selection module 120 may generate the selected metadata 122 based on various factors. For example, the selected metadata 122 may be generated based on capability data 124. The capability data 124 may indicate one or more capabilities of the media device 104. The media device 104 may provide the capability data 124 to the server 108 using the network. The capabilities may indicate various information associated with the media device 104 or the user 102. For example, the capability data 124 may indicate that the user 102 has paid for a subscription to the metadata 116(1). For the media device 104, in response to a determination that the capability data 124 includes data indicating that the user 102 has paid for the subscription, the server 108 may provide the metadata 116(1) to the media device 104. In another example, the capability data 124 may indicate whether the media device 104 may use a particular type of metadata 116. For example, the capability data 124 may indicate that the media device 104 may present video content 106 that is compatible with the MPEG-2 standard or the H.264 standard. The server 108 may provide the first metadata 116 to the media device 104 in response to a determination that the capability data 124 indicates that the media device 104 may present video content 106 that is compatible with the MPEG-2 standard or the H.264 standard.

The media device 104 may generate the capability data 124 by querying a datastore storing information about the different capabilities associated with the media device 104 or the user 102 associated with the media device 104. The media device 104 may or may not include the datastore storing the information about the different capabilities.

The media device 104 may provide QoS data 126 to the server 108. The QoS data 126 may indicate a requested QoS associated with video streamed by the media device 104. The QoS may include various types of indications. For example, the QoS may include a low QoS indicative of a request for video content having a low quality bitrate stream, a medium QoS indicative of a request for video content having a medium quality bitrate stream, or a high QoS indicative of a request for video content having a high quality bitrate stream. In response to a determination that the QoS data 126 indicated a request for high QoS, the metadata selection module 120 may generate the selected metadata 122 such that the selected metadata 122 includes at least the metadata 116(1) and 116(2). In response to a determination that the QoS data 126 indicated a request for medium QoS, the metadata selection module 120 may generate the selected metadata 122 such that the selected metadata 122 includes the metadata 116(1). In response to a determination that the QoS data 126 indicated a request for low QoS, the metadata selection module 120 may not generate selected metadata 122. The media device 104 may generate the QoS data 126 based on inputs received from the user 102 operating the user interface module 110.

The metadata selection module 120 may generate the selected metadata 122 based on bandwidth data 128. The bandwidth data 128 may indicate an amount of bandwidth between the server 108 and the media device 104. The metadata selection module 120 may generate the selected metadata 122 by selecting certain metadata 116 based on the amount of bandwidth. In one example, the metadata selection module 120 may, in response to the amount of the bandwidth being equal to or greater than a first threshold value, generate selected metadata 122 such that the selected metadata 122 includes the metadata 116(1).

The server 108 may include a bandwidth module 130 configured to generate the bandwidth data 128. The bandwidth module 130 may generate the bandwidth data 128 based on bandwidth test data 132. The bandwidth test data 132 may comprise a test file used to determine the bandwidth between the server 108 and the media device 104.

The media device 104 may include a frame analysis module 134 configured to use the selected metadata 122 to maintain presentation of the content 106. In one example, the frame analysis module 134 generates interpolated frames 136 in response to a determination that a dependent frame is unavailable for presentation.

The server 108 may include a load balancing module 138. The load balancing module 138 may be configured to determine when to generate the selected metadata 122. For example, the load balancing module 138 accesses resource consumption data 140 for processing. The resource consumption data 140 may indicate an amount of resources consumed by the server 108 to perform computational tasks. In one example, if the amount of resources is equal to or above a threshold amount of resources, the load balancing module 138 may terminate providing content 106 to the media device 104 and provide the selected metadata 122 to the media device 104.

In some implementations, the load balancing module 138 is configured to determine when to provide the selected metadata 122 to the media device 104. In some implementations, the server 108 is in communication with a plurality of different media devices 104. The connection between each media device and the server 108 may have different and changing bandwidths. The load balancing module 138 may determine to provide the selected metadata 122 to the media devices 104 having a higher amount of bandwidth when compared to other media devices 104.

Other information 142 may be provided by the media device 104 to the server 108, or by the server 108 to the media device 104. The other information 142 may include various data such as data indicating an amount of memory available, data indicating an identification of the media device 104 or server 108, metric data used to determine the resource consumption data 140, and so forth.

Figure 2:
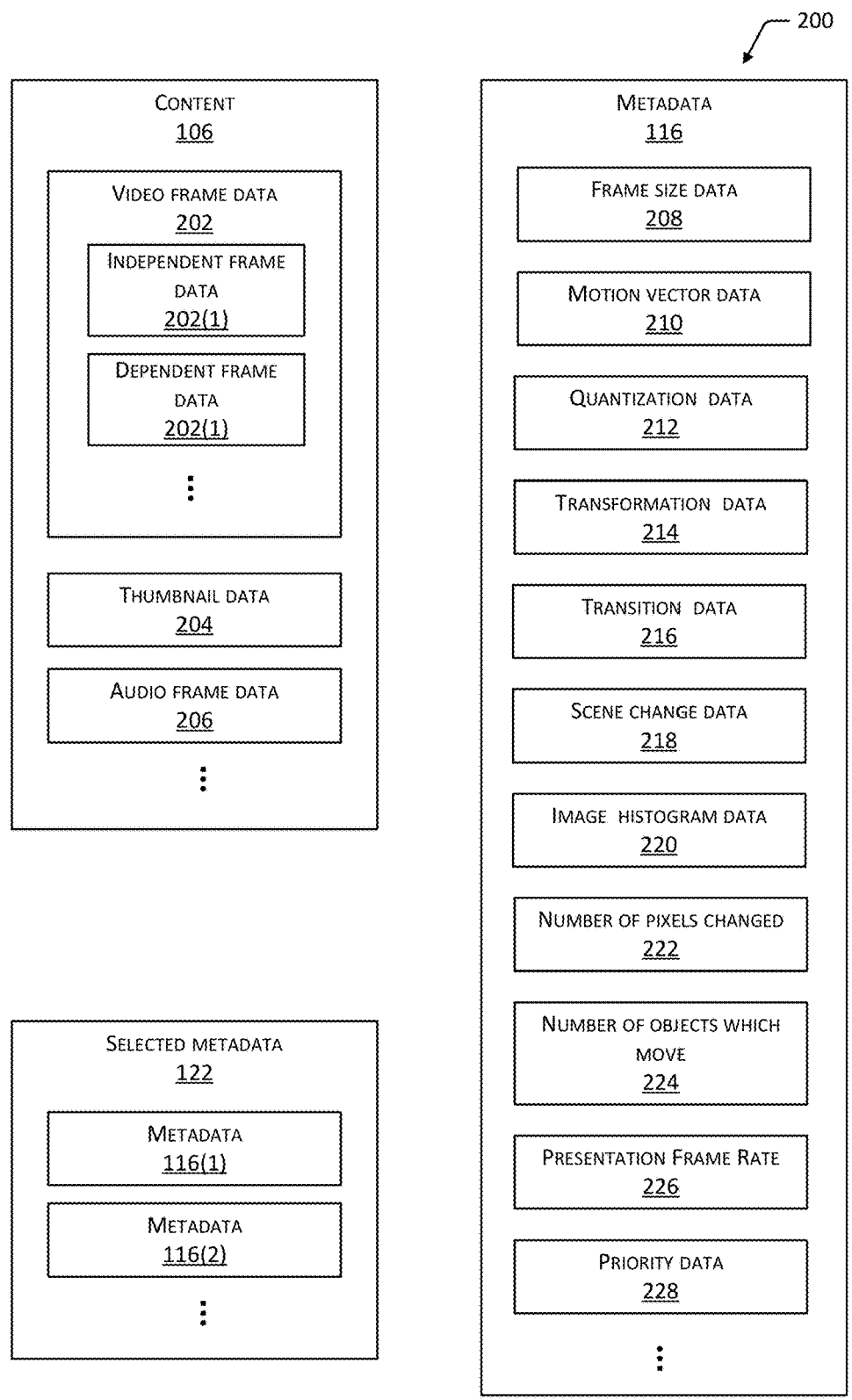
FIG. 2 illustrates examples of the content, the metadata, and the selected metadata.

FIG. 2 is an illustration 200 of examples of the content 106, the metadata 116, and the selected metadata 122. The content 106 may comprise video frame data 202, thumbnail data 204, audio frame data 206, and other information.

The video frame data 202 may comprise data representative of a video frame that represents an image, or a part of an image. A display output device of the media device 104 may present a plurality of video frames. The server 108 may encode the video frames using one or more encoding schemes. These encoding schemes may include data compression. In one implementation, the server 108 encodes the video frames that are decodable as described in the MPEG. In another implementation, the server 108 encodes the video frames using the H.264 standard developed by the VCEG and the MPEG.

The video frame data 202 may include independent frame data 202(1), dependent frame data 202(2), and so forth. The independent frame data 202(1) may comprise independent frames that comprise information configured to present an image without reference to another frame. For example, with regard to video frames which are encoded compliant to the MPEG2 or H.264 standards, the independent frames may comprise "intra frames" or "I frames". In comparison, the dependent frame data 202(2) may comprise dependent frames comprising information configured to present an image based on another frame, such as an independent frame, another dependent frame, and so forth.

The thumbnail data 204 may comprise still images based on images in the video frame data 202 at different points within a stream of the video frame data 202. For example, the thumbnail data 204 may contain sample images at two second intervals in the video frame data 202, on a scene change, and so forth.

The audio frame data 206 may comprise audio information associated with the video frames. The audio frame data 206 may be encoded using the MP2 MPEG-1 or MPEG-2 Audio Layer II format promulgated by the MPEG.

The content 106 may include other information such as information associated with one or more digital rights management schemes. In another example, the other information may specify frame size in bits for a particular video frame. The other information may be embedded or encoded in the video frame data 202, stored as a separate file, and so forth.

As described above, the metadata 116 may comprise information associated with content 106. In some implementations, the metadata 116 includes information about the bandwidth between the server 108 and the media device 104. In FIG. 2, the metadata 116 includes frame size data 208 indicative of the size of one or more video frames. The frame size may be expressed in terms of bits, bytes, a dimensionless value, a relative value, and so forth. For example, the frame size may be expressed as "small", "medium", or "large". In one example, image compression algorithms produce video frames for static scenes which are relatively small. The frame size may be for compressed or uncompressed video frames.

The metadata 116 may comprise motion vector data 210. The motion vector data 210 may provide information about one or more objects which have moved or otherwise been displaced relative to an earlier or later frame. In some implementations, motion vector data 210 associated with a data encoding scheme may be used. For example, the motion vector data 210 associated with an MPEG2 or MPEG4 encoding may be used.

The metadata 116 may comprise quantization data 212. The quantization data 212 may indicate quantization factors corresponding to coefficients of a transform used to encode the video frames of the content 106. The media device 104 may use the quantization data 212 to generate the interpolated frames 136.

The metadata 116 may comprise transformation data 214. The transformation data 214 may comprise information about which transform to apply to a video frame to generate one or more interpolated frames 136. The transform may comprise one of a Discrete Cosine Transform ("DCT"), a wavelet transform, and a Karhunen-Loève Transform ("KLT"). The transform may be determined based on the requested quality of service associated with video streamed by the media device 104.

The metadata 116 may comprise transition data 216. The transition data 216 may indicate a determination to switch from providing video at a first quality bitrate stream to a second quality bitrate stream. In some implementations, the media device 104 may use the transition data 216 to generate one or more interpolated frames 136.

The metadata 116 may comprise scene change data 218. The scene change data 218 may indicate a video frame in which a scene change occurs. In some implementations, the media device 104 uses the scene change data 218 to generate one or more interpolated frames 136.

The metadata 116 may comprise image histogram data 220. The image histogram data 220 may comprise information about the light distribution in an image. In some implementations, the media device 104 uses the image histogram data 220 to generate one or more interpolated frames 136.

The metadata 116 may comprise information indicating a number of pixels changed 222. For example, this may indicate a number of pixels which have changed color, luminosity, and so forth. The number of pixels changed 222 may be relative to one or more earlier or later frames.

The metadata 116 may comprise information indicating a number of objects which have moved or otherwise been displaced 224. For example, the number of objects may be one, corresponding to a ball falling from chair to a ground.

The metadata 116 may comprise information indicating a presentation frame rate 226 indicating the intended or specified number of frames per second at which the video frames are to be presented. For example, the presentation frame rate 226 may be 24 fps.

The metadata 116 may be associated with priority data 228. The priority data 228 may indicate a value used to rank the metadata 116 or a given portion of the metadata 116. For example, first metadata 116(1) may be associated with a first priority and second metadata 116(2) may be associated with a second priority. The metadata selection module 120 may be configured to select the first metadata 116(1) in response to a determination that the first priority is higher than the second priority. In some implementations, the priorities may change. In one example, a priority may change in response to a determination that the amount of bandwidth is less than or equal to a threshold amount.

The priority values associated with the metadata 116 may be determined based on various factors. For example, video content 106 may be associated with motion vector data 210 and quantization data 212. At a first time, the amount of bandwidth between the server 108 and the media device 104 may be equal to or greater than a threshold amount. At the first time, the motion vector data 210 is assigned a higher priority than the quantization data 212. This assignment of priorities may result in the server 108 providing the motion vector data 210 and not the quantization data 212. At a second, later time, the amount of bandwidth may change. In this example, at the second time, the amount of bandwidth drops below the threshold amount. In response to the bandwidth dropping, the server 108 may assign the motion vector data 210 with a lower priority when compared to the quantization data 212. Accordingly, when the amount of bandwidth between the server 108 and the media device 104 is below the threshold, the server 108 may provide the quantization data 212 and not the motion vector data 210.

The selected metadata 122 may comprise one or more different metadata 116. For example, in FIG. 2, the selected metadata 122 comprises at least metadata 116(1) and 116(2).

The metadata 116 may comprise other information. For example, the metadata 116 may include author name, artist name, title, content rating, digital rights management information, and so forth. The metadata 116 may be embedded or encoded in the video frame, stored as a separate file, and so forth. The metadata 116 may include information identifying which frames the metadata 116 may be applied to. The identification may be based on a time period (e.g., the frames received within the last two seconds) or an identification number associated with the frames. In some implementations, the metadata 116 includes information that identifies which type of frame the metadata 116 may be applied to. For example, metadata 116(1) may be associated with an I frame, and metadata 116(2) may be associated with a P frame or B frame.

Figure 3:
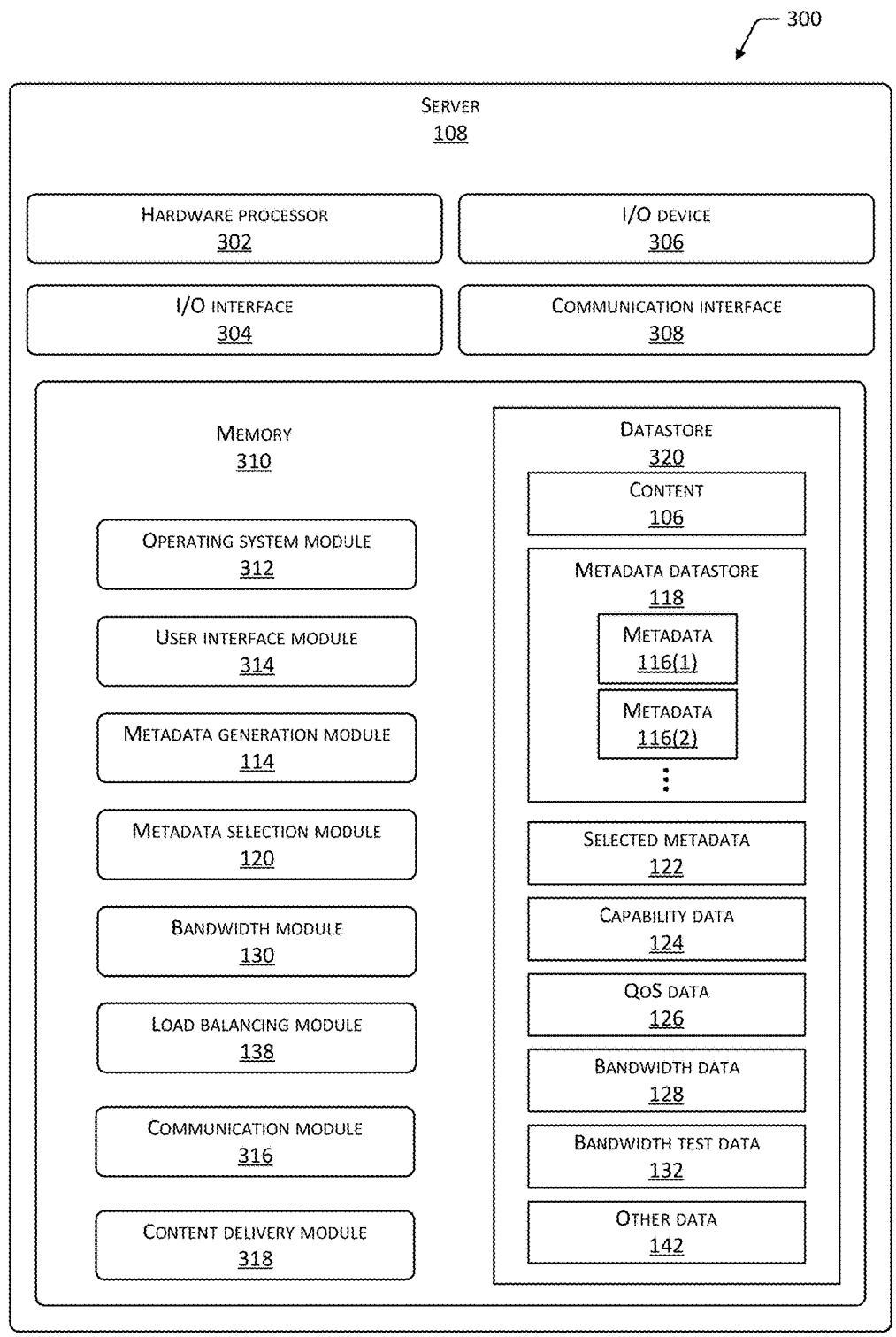
FIG. 3 is a block diagram of the server configured to generate selected metadata.

FIG. 3 illustrates a block diagram 300 of the server 108. As described above the server 108 may generate selected metadata 122 that may be used by a media device 104 to maintain the presentation of video content 106. The functions associated with the server 108 described in this disclosure may be implemented by one or more servers 108, and by one or more entities. For example, in one implementation, one server 108 may provide and distribute the content 106 while another generates the selected metadata 122. The one or more servers 108 may be physical server devices or virtual servers executing on physical server devices.

The server 108 may include at least one hardware processor 302 (or "processor") configured to execute stored instructions. The at least one hardware processor 302 may comprise one or more cores.

The server 108 includes at least one I/O interface 304 which enables portions of the server 108 (e.g., the hardware processor 302) to communicate with other devices. The I/O interface 304 may be configured to implement various protocols, such as inter-integrated circuit ("I2C"), serial peripheral interface bus ("SPI"), Universal Serial Bus ("USB"), RS-232, HDMI, TOSLINK, Bluetooth®, and so forth. The at least one I/O interface 304 may be operatively connected to at least one I/O device 306. In some implementations, certain I/O devices 306 are physically incorporated with the server 108 or externally placed.

The at least one I/O interface 304 may be operatively connected to one or more I/O devices 306. The I/O devices 306 may include input devices such as one or more of a keyboard, a touch sensor, and so forth. The I/O devices 306 may also include output devices such as one or more of a display, printer, and so forth. In some embodiments, the I/O devices 306 may be physically incorporated with the server 108 or may be externally placed and communicatively coupled thereto.

The server 108 may include at least one communication interface 308. The communication interface 308 may be configured to provide communications between the server 108 and other devices such as the media device 104, routers, access points, other servers 108, and so forth. The communication interface 308 may include an Ethernet interface which connects to the network.

The server 108 may also include one or more busses or other internal communications hardware or software that allow for the transfer of data between the various modules and components of the server 108.

As illustrated in FIG. 3, the server 108 may include at least one memory or memory device 310. The memory 310 may include at least one non-transitory computer-readable storage media ("CRSM"). The CRSM may include at least one of an electronic storage medium, a magnetic storage medium, an optical storage medium, a quantum storage medium, or a mechanical computer storage medium. The memory 310 may include computer readable instructions, data structures, program modules, and other data for the operation of the server 108.

The memory 310 may include at least one operating system ("OS") module 312. The OS module 312 may be configured to manage hardware resources such as the I/O interface 304, the I/O devices 306, the communication interface 308, and provide various services to applications or modules executing on the hardware processor 302. The memory 310 may also store at least one of the following modules which may be executed as foreground applications, background tasks, daemons, and so forth.

The memory 310 may include a user interface module 314 configured to provide a user interface to the user 102 or to the media device 104. In one implementation, the user interface may be a web interface presented via the network and accessible to the users 102. In another implementation the user interface may comprise an application programming interface ("API") which enables communication such as sending requests for content 106 from the media device 104 to the server 108.

As described above, the metadata generation module 114 is configured to generate the metadata 116. In some implementations, the metadata generation module 114 may generate the metadata 116 by analyzing the content 106. In other implementations, the metadata generation module 114 may generate the metadata 116 by querying the metadata datastore 118.

As described above, the metadata selection module 120 may be configured to generate the selected metadata 122. The metadata selection module 120 may generate the selected metadata 122 based on various factors. For example, the selected metadata 122 may be generated based on at least one of the capability data 124, the QoS data 126, or the bandwidth data 128.

The memory 310 may include the bandwidth module 130 configured to generate the bandwidth data 128. The bandwidth module 130 may generate the bandwidth data 128 using the bandwidth test data 132. The bandwidth test data 132 may comprise a test file used to determine the bandwidth between the server 108 and the media device 104.

The memory 310 may include the load balancing module 138. The load balancing module 138 may be configured to determine when to generate the selected metadata 122. In one example, the load balancing module 138 accesses the resource consumption data 140 for processing. The resource consumption data 140 may indicate an amount of resources consumed by the server 108 to perform computational tasks. In one example, if the amount of resources is equal to or above a threshold amount of resources, the load balancing module 138 may terminate providing content 106 to the media device 104 and provide the selected metadata 122 to the media device 104.

In some implementations, the load balancing module 138 is configured to determine when to provide the selected metadata 122 to the media device 104. In some implementations, the server 108 is in communication with a plurality of different media devices 104. The connection between each media device and the server 108 may have different and changing bandwidths. The load balancing module 138 may determine to provide the selected metadata 122 to the media devices 104 having a higher amount of bandwidth when compared to other media devices 104.

The memory 310 may include a communication module 316 configured to establish and support communications between the server 108 other devices. The communication module 316 may access the communication interface 308 to exchange information. For example, the communication module 316 may be configured to stream the content 106 to the media device 104 using the network.

The memory 310 may include a content delivery module 318 configured to stream the content 106 to one or more of the media devices 104. The streaming of the content 106 may be initiated by a request from the media device 104, by the server 108, or another device. For example, in some implementations the user 102 may use a third device to initiate streaming from the server 108 and presentation on the media device 104.

The memory 310 may include other modules. For example, an authentication module may be configured to authorize delivery of the content 106 to a particular media device 104.

In some implementations, the memory 310 includes a datastore 320 for storing information. The datastore 320 may use a flat file, database, linked list, tree, or other data structure to store the information. In some implementations, the datastore 320, or a portion thereof, may be distributed across at least one other device, such as a server, a network storage device, and so forth. As illustrated in FIG. 3, the datastore 320 may include at least one of the content 106, the metadata datastore 118, the selected metadata 122, the capability data 124, the QoS data 126, the bandwidth data 128, or the bandwidth test data 132. The datastore 320 may include the other data 142 which may include information such as administrator preferences, account information associated with the user 102, and so forth.

Figure 4:
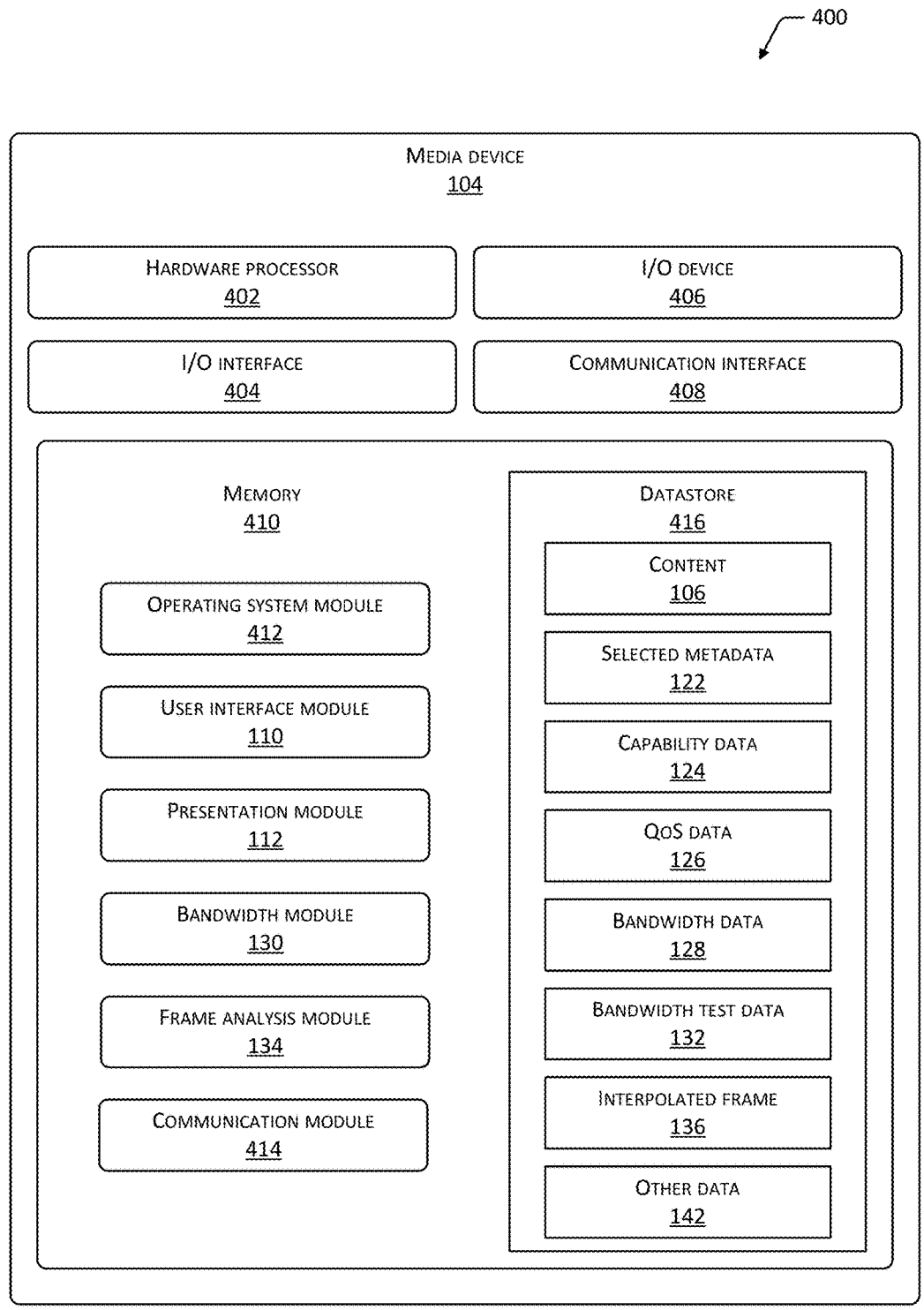
FIG. 4 is a block diagram of the media configured to use the selected metadata to maintain presentation of the content.

FIG. 4 illustrates a block diagram 400 of the media device 104. As described above, the media device 104 may be configured to maintain presentation of the content 106 using the selected metadata 122. The media device 104 may include one or more hardware processors 402 (or "processors") configured to execute stored instructions. The processors 402 may comprise one or more cores.

The media device 104 includes at least one I/O interface 404 which enables portions of the media device 104 (e.g., the hardware processor 402) to communicate with other devices. The I/O interface 404 may be configured to implement various protocols, such as I2C, SPI, USB, RS-232, HDMI, TOSLINK, Bluetooth®, and so forth. The at least one I/O interface 404 may be operatively connected to at least one I/O device 406. In some implementations, certain I/O devices 406 are physically incorporated with the media device 104 or externally placed.

The at least one I/O interface 404 may be operatively connected to one or more I/O devices 406. The I/O devices 406 may include input devices such as one or more of a keyboard, a touch sensor, and so forth. The I/O devices 406 may also include output devices such as one or more of a display, printer, and so forth. In some embodiments, the I/O devices 406 may be physically incorporated with the media device 104 or may be externally placed and communicatively coupled thereto.

The media device 104 may also include at least one communication interface 408. The at least one communication interfaces 408 may be configured to provide communications between the media device 104 and other devices such as the server 108, routers, access points, other servers, and so forth. The communication interfaces 408 may include personal area networks, wireless local area networks, wireless wide area networks, and so forth. The media device 104 may communicate with the remote control using one or more of the communication interfaces 408. For example, the media device 104 may communicate with the remote control using a Bluetooth personal area network.

The media device 104 may also include one or more busses or other internal communications hardware or software that allow for the transfer of data between the various modules and components of the media device 104.

As illustrated in FIG. 4, the media device 104 may include at least one memory or memory device 410. The memory 410 may include at least one non-transitory CRSM. The CRSM may include at least one of an electronic storage medium, a magnetic storage medium, an optical storage medium, a quantum storage medium, or a mechanical computer storage medium. The memory 410 may include computer readable instructions, data structures, program modules, and other data for the operation of the media device 104.

The memory 410 may include at least one OS module 412. The OS module 412 is configured to manage hardware resource devices such as the I/O interfaces 404, the I/O devices 406, the communication interfaces 408, the device interfaces, and provide various services to applications or modules executing on the hardware processor 402. The memory 410 may also store at least one of the following modules which may be executed as foreground applications, background tasks, daemons, and so forth.

The memory 410 may include the user interface module 110 configured to provide the user interface to the user 102 using the I/O devices 406 and accept inputs received from the user input I/O devices 406. The user interface may include one or more visual, audible, or haptic elements.

The memory 410 may include the presentation module 112. The presentation module 112 may be configured to present content 106 on the media device 104 or another device communicatively coupled thereto, such as a television connection using HDMI. The presentation module 112 is configured to receive content 106 streamed from an external source device such as the server 108 or another media device 104, such as in a peer-to-peer configuration. The presentation module 112 may be configured to repeat or present more than once one or more of the video frames determined to be repeatable. The determination as to which video frames are repeatable may be provided by the frame analysis module 134. The presentation module 112 may also determine when to initiate and when to discontinue repetition. The presentation module 112 may initiate frame repetition such as when the bandwidth from the server 108 to the media device 104 drops below a threshold, or when a buffer refill/buffer empty ratio drops below 1.0.

The memory 410 may include the bandwidth module 130 configured to generate the bandwidth data 128. The bandwidth module 130 may generate the bandwidth data 128 based on the bandwidth test data 132. The bandwidth test data 132 may comprise a test file used to determine the bandwidth between the server 108 and the media device 104.

As described above, the frame analysis module 134 is configured to generate the interpolated frames 136. The interpolated frames 136 may be generated based on the selected metadata 122. The media device 104 may use the selected metadata 122 to maintain presentation of the content 106. In one example, the frame analysis module 134 generates interpolated frames 136 in response to a determination that a dependent frame is unavailable for presentation.

The memory 410 may include a communication module 414 configured to establish and support communications between the media device 104 other devices. The communication module 414 may access the communication interface 408 to exchange information. For example, the communication module 414 may be configured to request content 106 from the server 108 using the network.

The memory 410 may include other modules. For example, a digital rights management module may work in conjunction with the presentation module 112 to facilitate access to content 106.

The memory 410 may also include a datastore 416 to store information. The datastore 416 may use a flat file, database, linked list, tree, or other data structure to store the information. In some implementations, the datastore 416 or a portion of the datastore 416 may be distributed across one or more other devices including servers, network attached storage devices, and so forth.

The datastore 416 may store a portion of the content 106, such as that in the buffer. The datastore 416 may store one or more of the selected metadata 122, the capability data 124, the QoS data 126, the bandwidth data 128, the bandwidth test data 132, the interpolated frame 136, or the other data 142. Other data may also be stored, such as user preferences, account login information, and so forth.

Figure 5:
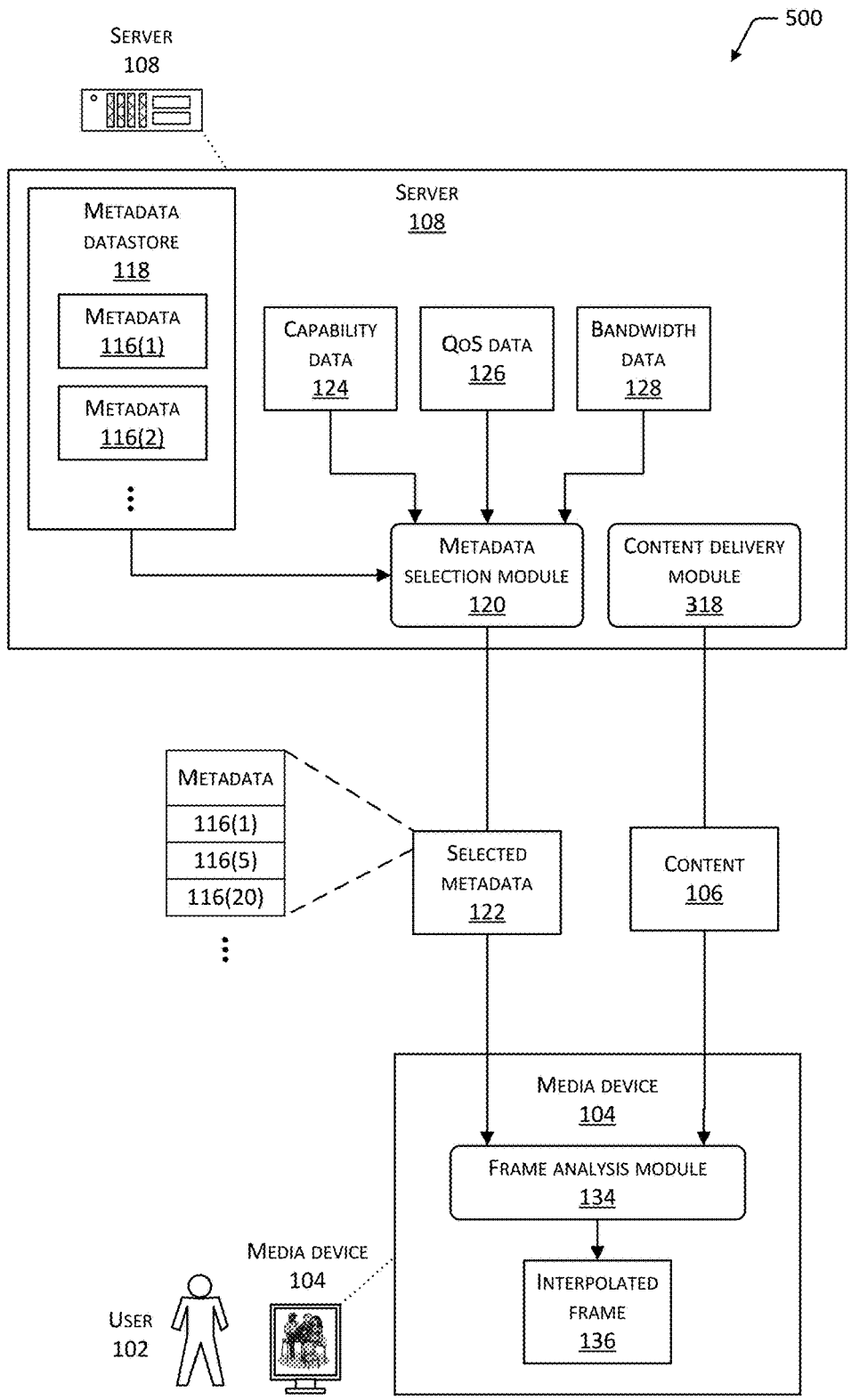
FIG. 5 is an illustration of the generation of an example interpolated frame using the content and the selected metadata as inputs.

FIG. 5 is an illustration 500 of the frame analysis module 134 generating the interpolated frame 136 using the content 106 and the selected metadata 122 as inputs. The content delivery module 318 may provide the content 106 to the media device 104 using the network described above.

The metadata selection module 120 generates the selected metadata 122 using the capability data 124, the QoS data 126, and bandwidth data 128 as inputs. The metadata selection module 120 may select certain metadata 116 from the metadata datastore 118 based on the capabilities of the media device 104. In one example, the capability data 124 may indicate that the media device 104 may present video content that is compatible with the MPEG-2 standard. The first metadata 116(1) may be selected in response to a determination that the capability data 124 indicates compatibility with the MPEG-2 standard. The metadata selection module 120 may determine not to select the second metadata 116(2) in response to a determination that the capability data 124 indicates compatibility with the MPEG-2 standard.

The metadata selection module 120 may select certain metadata 116 from the metadata datastore 118 based on the requested quality of service. The QoS data 126 indicates that the user 102 has requested a first quality of service that is higher than a second quality of service. For example, the first quality of service may correspond to a request for content presentation in 1080p, and the second quality of service may correspond to a request for content presentation in 720p. The first metadata 116(1) may be selected in response to a determination that the QoS data 126 indicates a request for the first quality of service. The metadata selection module 120 may determine not to select the second metadata 116(2) in response to a determination that the QoS data 126 indicates a request for the first quality of service.

The metadata selection module 120 may select certain metadata 116 from the metadata datastore 118 based on the bandwidth between the server 108 and the media device 104. The bandwidth data 128 may indicate that the amount of bandwidth between the server 108 and the media device 104 is a first amount. The first metadata 116(1) may be selected in response to a determination that the first amount is equal to or greater than a threshold amount. The metadata selection module 120 may determine not to select the second metadata 116(2) in response to a determination that the first amount is less than the threshold amount.

Figure 6:
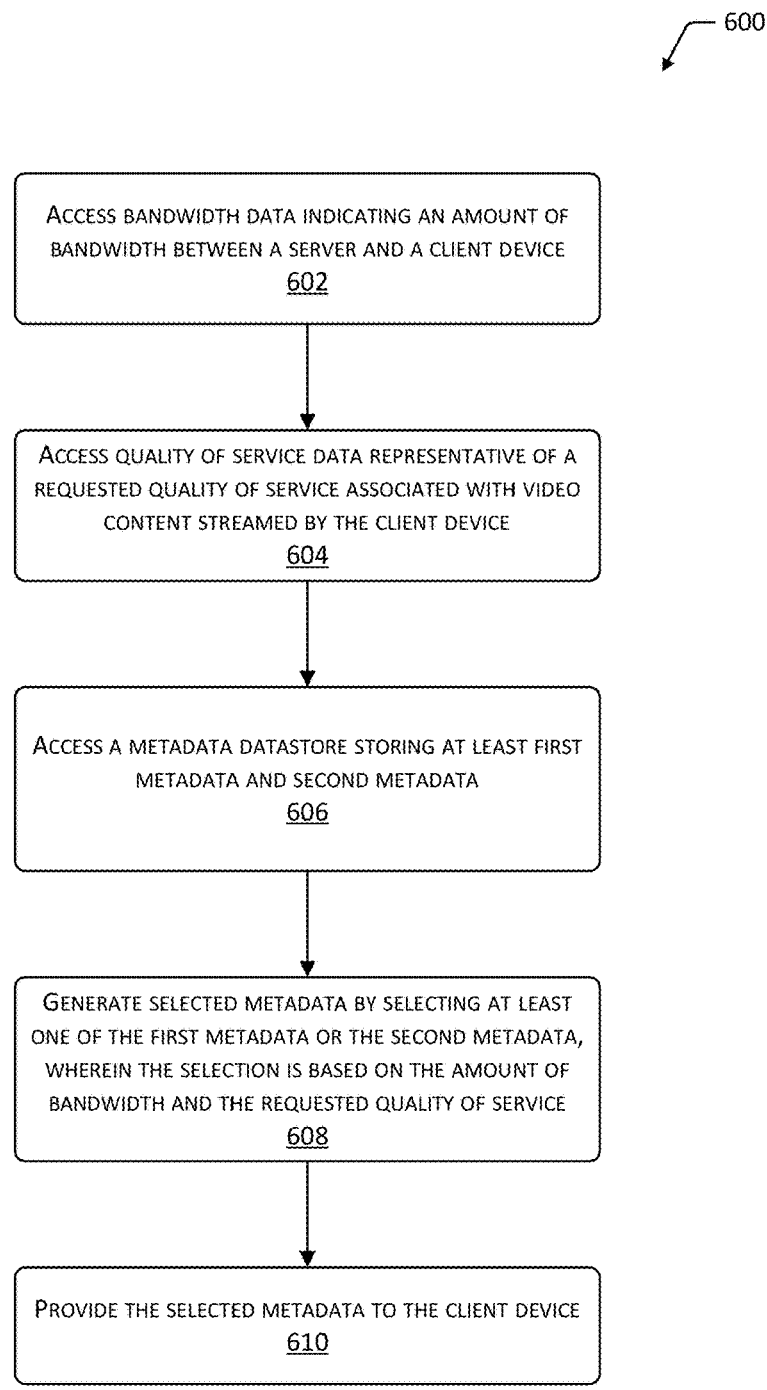
FIG. 6 is a flow diagram illustrating a process of generating selected metadata based on the bandwidth and the requested quality of service for streaming the video content.

FIG. 6 is a flow diagram illustrating a process 600 of generating selected metadata 122 based on the bandwidth and the requested quality of service for streaming the video content. Although the process 600 is described with reference to the flowchart illustrated in FIG. 6, many other methods performing the acts associated with the process 600 may be used. For example, the order of the steps may be changed, some of the steps described may be optional, and additional steps may be included.

At 602, the server 108 accesses the bandwidth data 128 indicating an amount of bandwidth between the server 108 and the media device 104. The server 108 is configured to generate the bandwidth data 128 based on the bandwidth test data 132. In some implementations, the media device 104 is configured to generate the bandwidth data 128 and provide the bandwidth data 128 to the server 108.

At 604, the server 108 accesses quality of service data 126 representative of a requested quality of service associated with video content streamed by the media device 104. In some implementations, the quality of service may describe the bitrate of the video content. For example, a request for a high quality of service may correspond to a request for the media device 104 to display the video content with 1080p picture quality, and a request for a low quality of service may correspond to a request for the media device 104 to display the video content with a 720p picture quality.

At 606, the server 108 accesses the metadata datastore 118 storing at least first metadata 116(1) and second metadata 116(2). The server 108 may be configured to generate some or all of the metadata 116 stored within the metadata datastore 118. In some implementations, some or all of the metadata 116 is generated by another computing device, such as a different server (not shown) that provides the metadata 116 to the server 108.

At 608, the server 108 generates selected metadata 122 by selecting at least one of the first metadata 116(1) or the second metadata 116(2). The selection is based on the amount of bandwidth and the requested quality of service. In one example, the server 108 selects the first metadata 116(1) in response to a determination that the amount of bandwidth is equal to or greater than a threshold amount. In another example, the server 108 selects the second metadata 116(2) in response to a determination that a particular quality of service has been requested by the user 102.

At 610, the server 108 provides the selected metadata 122 to the media device 104. The server 108 may provide the selected metadata 122 using the network described above. In some implementations, the server 108 is configured to determine when to provide selected metadata 122 to the one or more media devices 104. For example, the server 108 may determine that a first bandwidth between the server 108 and a first media device 104 is equal to a less than a threshold amount, and that the second bandwidth between the server 108 and a second media device 104 is greater than the threshold amount. In response to these determinations, the server 108 may be configured to provide selected metadata 122 to the second media device 104, and not the first media device 104.

Figure 7:
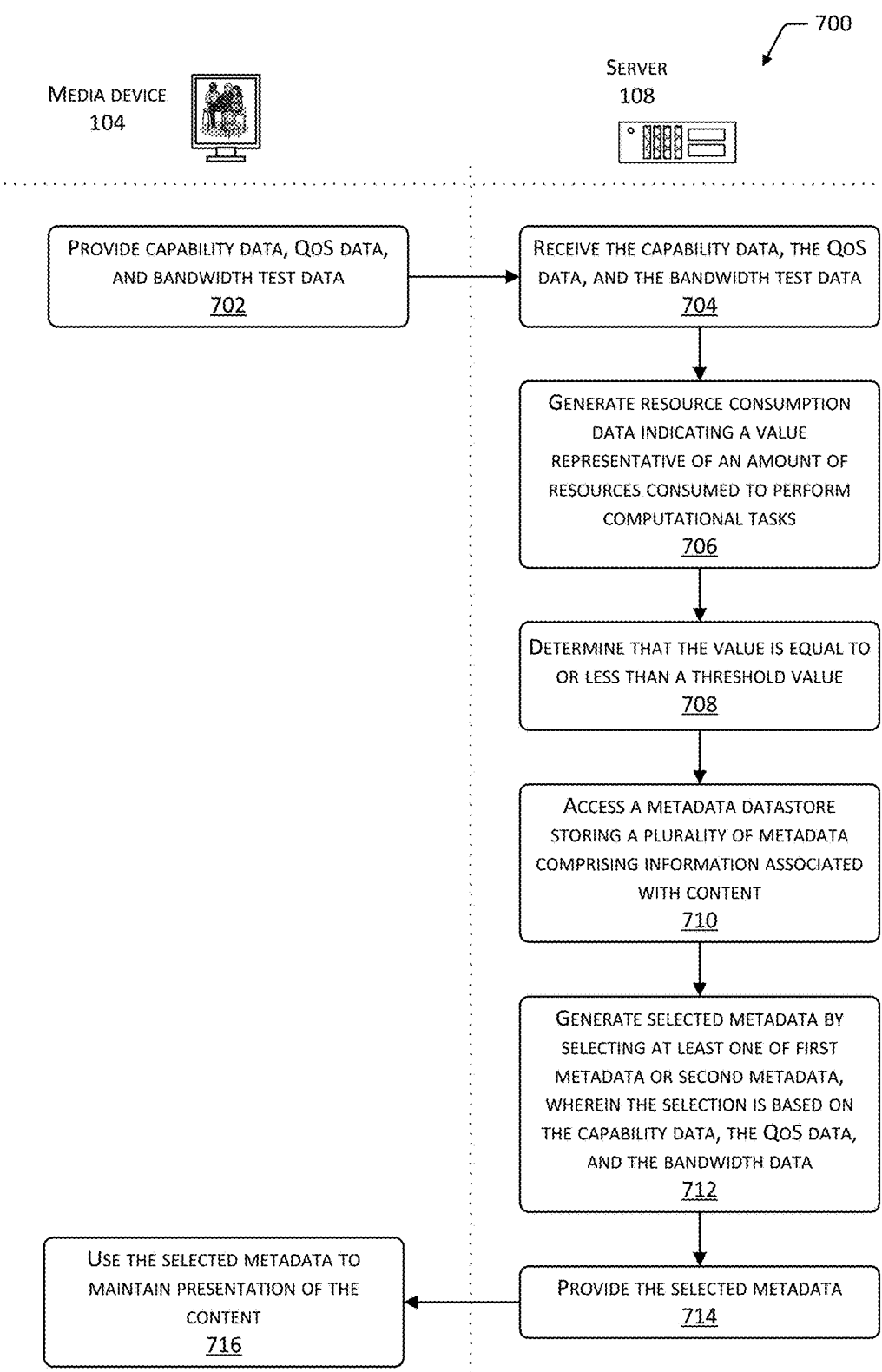
FIG. 7 is a flow diagram illustrating a process of using selected metadata to maintain presentation of content.

FIG. 7 is a flow diagram illustrating a process 700 of using selected metadata 122 to maintain presentation of content 106. Although the process 700 is described with reference to the flowchart illustrated in FIG. 7, many other methods performing the acts associated with the process 700 may be used. For example, the order of the steps may be changed, some of the steps described may be optional, and additional steps may be included.

At 702, the media device 104 provides the capability data 124, the QoS data 126, and the bandwidth test data 132. The media device 104 may provide this data using the network described above. The capability data 124 may be generated by accessing or reading a database or file which stores information about the capabilities of the media device 104.

The QoS data 126 may be generated in response to inputs received by the user 102 which indicate the type of quality of service the user 102 desires regarding the quality of the video stream. The bandwidth test data 132 may be described as information used by the server 108 to determine the bandwidth between the server 108 and the media device 104. At 704, the server 108 receives the capability data 124, the QoS data 126, and the bandwidth test data 132.

At 704, the server 108 generates resource consumption data 140 indicating a value representative of an amount of resources consumed to perform computational tasks. The resources consumed may include memory, processor, data transfer, and so forth. The metrics used to determine the amount of resources consumed may be generated during processing of actual service calls, or based on the execution of benchmark tests using predetermined service calls or sample service calls.

At 704, the server 108 determines that the value (representative of an amount of resources consumed to perform computational tasks) is equal to or less than a threshold value. The value may be expressed as a dimensionless scaled number having values, for example, between 1 and 1000. In some implementations, the server 108 terminates providing content 106 to the media device 104 in response to a determination that the value is greater than the threshold value.

At 704, the server 108 accesses the metadata datastore 118 storing a plurality of metadata 116 comprising information associated with content 106. At 704, the server 108 generates selected metadata 122 by selecting at least one of first metadata 116(1) or second metadata 116(2). In this example, the selection is based on the capability data 124, the QoS data 126, and the bandwidth data 128. In other examples, the selection is based on at least one of the capability data 124, the QoS data 126, or the bandwidth data 128.

At 714, the server 108 provides the selected metadata 122 to the media device 104. The server 108 may provide the selected metadata 122 to the media device 104 using the network described above. At 716, the media device 104 uses the selected metadata 122 to maintain presentation of the content 106.

Figure 8:
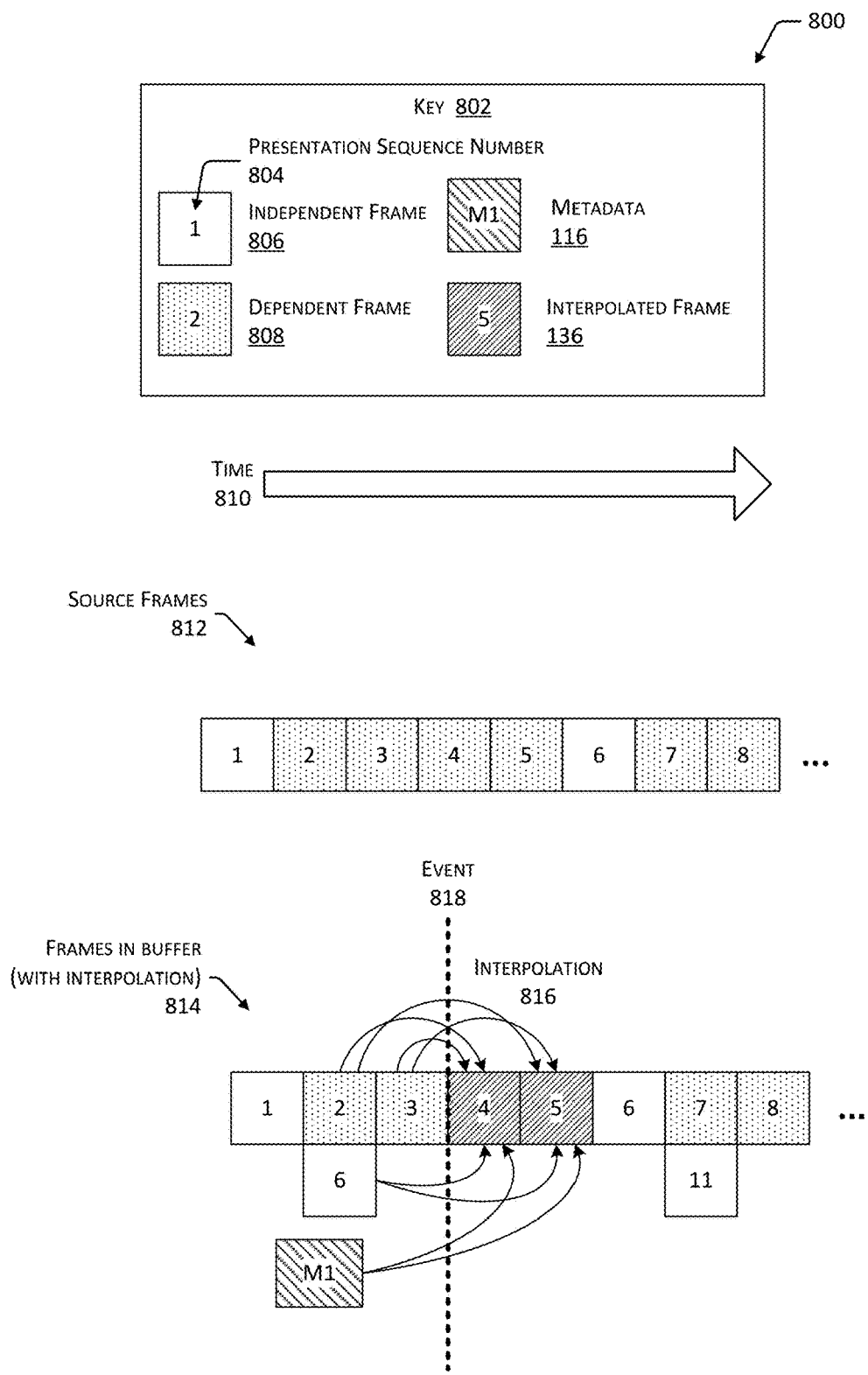
FIG. 8 depicts an illustration of frames in a buffer generated by using interpolation based on an independent frame and metadata delivered in advance.

FIG. 8 depicts an illustration 800 of frames in a buffer generated by using interpolation based on an independent frame and metadata 116 delivered in advance. A key 802 is depicted indicating graphic representations including presentation sequence numbers 804 of the independent frames 806, the dependent frames 808, interpolated frames 136, and metadata 116. These graphic representations are used in FIG. 8 to indicate these different types of information.

For ease of illustration, and not by way of limitation, some data associated with the video frames is not depicted here. For example, the audio frames which correspond to the video frames are not shown, but may be provided to the media device 104. In another example, thumbnail images may be provided to the media device 104.

In this illustration, time increases from left to right, as indicated by the arrow 810. A plurality of source frames 812 is depicted. The source frames 812 may comprise "raw" or uncompressed video frames, compressed video frames, and so forth. The source frames 812 may be stored on the server 108. In some implementations, a plurality of different source frames 812 may be available for the same piece of content 106. For example, a first set of source frames 812 may be encoded at a first bitrate, a second set encoded at a second bitrate, and so forth. The content delivery module 318 may select which of these source frames 812 to deliver.

By way of illustration and not necessarily as a limitation, the source frames 812 comprise compressed data, including independent frames 806 at various intervals interspersed with dependent frames 808. The source frames 812 may be streamed to the media device 104 via the network for presentation. However, as described above, the network, the media device 104, or other factors may result in unavailable frames. Unavailable frames are those which would be presented by the presentation module 112 if available, but are unsuitable or not present in the buffer.

Frames in the buffer 814 with interpolation 816 are depicted. In this scenario, the server 108 has provided metadata 116(M1) associated with the video frames. Following an event 818, such as a change in quality being streamed due to operation of the ABS, corruption during transmission, and so forth, frames may become unavailable. During typical presentation, their absence would result in a stutter, dropout, or other presentation anomaly. The frame analysis module 134 is configured to use the metadata 116 and previously received video frames such as the independent frames 806, the dependent frames 808, or both, to extrapolate and generate the interpolated frames 136. In comparison, frames in the buffer 814 with interpolation 816 are depicted. In this scenario, frames are delivered by the server 108 out-of-sequence, such that independent frames 806 "lead" or are delivered in advance of some dependent frames 808. For example, as illustrated here, independent frame 806(1) is delivered first, followed by contemporaneous delivery of dependent frame 808(2) and independent frame 806(6). The transmission of the independent frames 806 may be offset to avoid exceeding the available bandwidth.

As time progresses, the event 818 occurs. The frame analysis module 134 is used to perform the interpolation 816, generating the interpolated frames 136(4) and 136(5). The interpolation 816 may be based on the previously received frames, including the independent frame 806(6) which was delivered earlier.

In FIG. 8, the independent frames 806, the dependent frames 808(2) and 808(3), and the metadata (M1) are used to generate the interpolated frames 136(4)-(5). These interpolated frames 136 are used to fill a gap resulting from the event 818, such as late video frames, corrupt video frames, and so forth.

Figure 9:
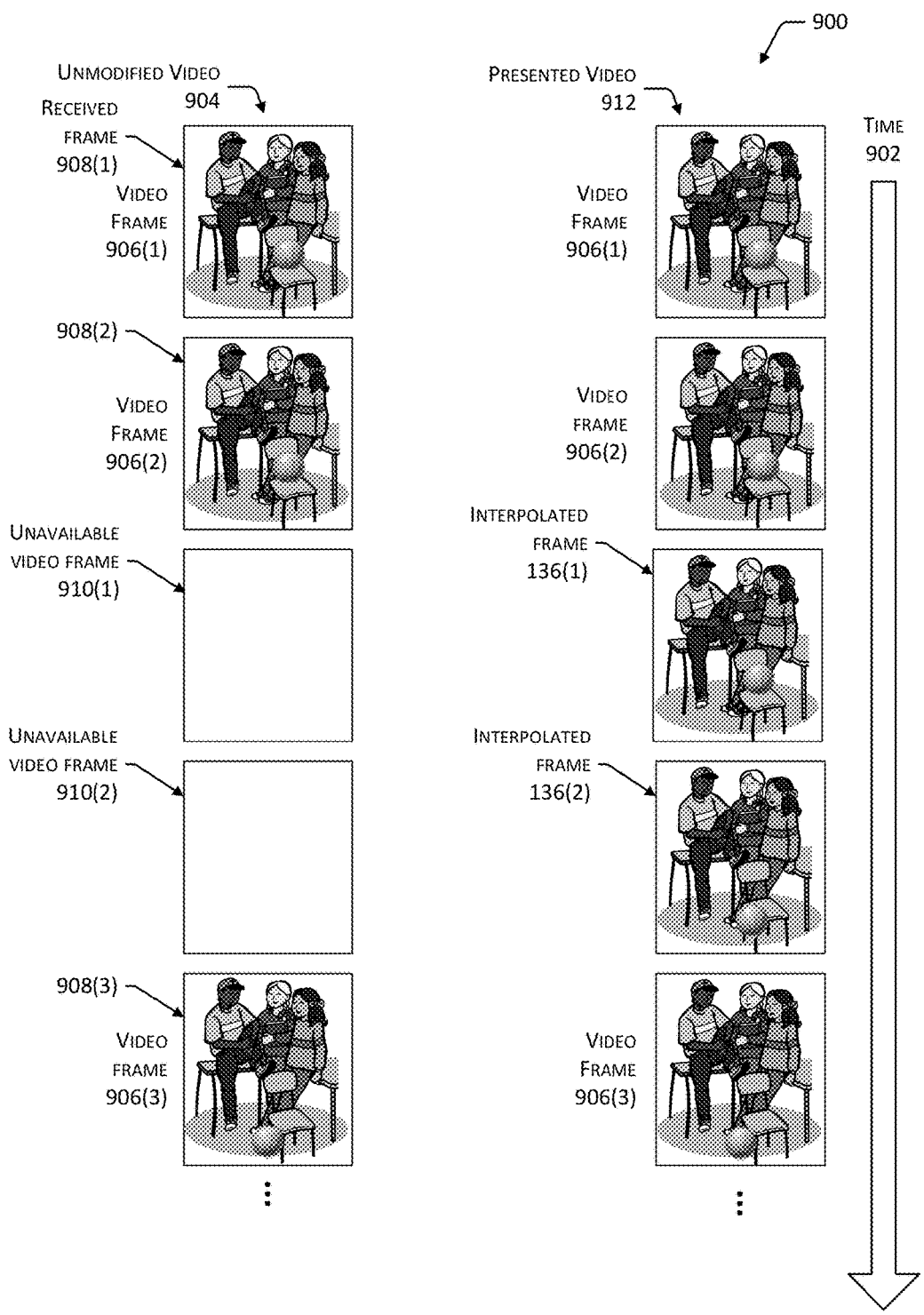
FIG. 9 illustrates sequences of video frames for unmodified video and presented video which includes interpolated frames.

FIG. 9 illustrates sequences 900 of video frames of the video frame data 202 which includes interpolated frames 136. In this illustration, arrow 902 indicates time, with time increasing down the page. Unmodified video 904 is depicted. The unmodified video 904 is a sequence of the video frames 906 presented by the presentation module 112 when the data transfer rate is at or above a transfer threshold. A section of the unmodified video 904 depicted here shows video frames 906(1)-(3). The video frames 906(1)-(3) are designated as received frames 908(1)-(3), respectively. A section of the unmodified video 904 depicted shows unavailable video frames 910(1) and 910(2). As described above, the unavailable video frames 910(1) and 910(2) may have become unavailable due to corruption during transmission. Presentation of absent or unavailable video frames 910 would result in a stutter or dropout, and an undesirable user experience.

Also depicted is presented video 912 shown when the frame analysis module 134 uses the selected metadata 122 (not shown) to perform the interpolated frames 136(1) and 136(2). In this example, the selected metadata 122 includes motion vector data 210 representative of information about the basketball depicted in FIG. 9 falling from the chair to the ground. The interpolated frames 136(1) and 136(2) may be generated based on an analysis of the previously received frames 908(1) and 908(2), and the motion vector data 210 indicating that the basketball is falling from the chair to the ground. The interpolated frames 136(1) and 136(2) are used to replace the unavailable video frames 910(1) and 910(2). By displaying the interpolated frames 136(1) and 136(2) rather than the unavailable video frames 910(1) and 910(2), the gap resulting from the presentation of the unavailable video frames 910(1) and 910(2) is filled, resulting in a more desirable user experience.

Those having ordinary skill in the art will readily recognize that certain steps or operations illustrated in the figures above can be eliminated or taken in an alternate order. Moreover, the methods described above may be implemented as one or more software programs for a computer system and are encoded in a computer readable storage medium as instructions executable on one or more processors.

Embodiments may be provided as a computer program product including a non-transitory computer readable storage medium having stored thereon instructions (in compressed or uncompressed form) that may be used to program a computer (or other electronic device) to perform processes or methods described herein. The computer readable storage medium can be any one of an electronic storage medium, a magnetic storage medium, an optical storage medium, a quantum storage medium and so forth. For example, the computer readable storage media may include, but is not limited to, hard drives, floppy diskettes, optical disks, read-only memories (ROMs), random access memories (RAMs), EPROMs, EEPROMs, flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of machine-readable signals, whether modulated using a carrier or not, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across separate computer systems. Thus, although certain steps have been described as being performed by certain devices, software programs, processes, or entities, this need not be the case and a variety of alternative implementations will be understood by those having ordinary skill in the art.

Additionally, those having ordinary skill in the art readily recognize that the techniques described above can be utilized in a variety of devices, environments and situations. Although the present disclosure is written with respect to specific embodiments and implementations, various changes and modifications may be suggested to one skilled in the art and it is intended that the present disclosure encompass such changes and modifications that fall within the scope of the appended claims.

What is claimed is:

1. A system for providing video content comprising:
a communication interface;
a memory storing computer-executable instructions; and
a processor communicatively coupled to the communication interface and the memory, the processor configured to execute the computer-executable instructions to:
access capability data indicating one or more capabilities of a media device;
access bandwidth data indicating an amount of bandwidth between a server and the media device;
access quality of service data indicating a requested quality of service associated with the video content streamed to the media device;
access a metadata datastore storing a plurality of metadata associated with the video content, wherein the plurality of metadata includes first metadata and second metadata;
generate resource consumption data indicating an amount of resources consumed to perform computational tasks;
in response to the amount of resources consumed as indicated by the resource consumption data being equal to or less than a threshold amount of resources, generate metadata comprising information associated with video frames of the video content including transformation data by selecting at least one of the first metadata or the second metadata, wherein the selection is based on the one or more capabilities of the media device, the amount of bandwidth and the requested quality of service; and
provide the metadata to the media device to maintain presentation of the video content by the media device using the metadata including the transformation data that includes information that indicates a transform to apply to a video frame for generation of one or more interpolated frames for adapting transmission of the video content to conditions affecting the presentation of the video content.

2. The system of claim 1, wherein:
the first metadata is selected in response to:
the amount of bandwidth being equal to or greater than a first threshold amount; and
the requested quality of service comprising a first requested quality of service;
the second metadata is selected in response to:
the amount of bandwidth being equal to or greater than a second threshold amount; and
the requested quality of service comprising a second requested quality of service; and
the first requested quality of service is different from the second requested quality of service.

3. The system of claim 1, wherein the processor is further configured to execute the computer-executable instructions to:
provide, at a first quality bitrate stream, the video content to the media device; and
generate transition data representative of a determination for the server to switch from providing the video content at the first quality bitrate stream to a second quality bitrate stream, wherein:
the metadata includes the transition data; and
the media device is configured to use the transition data to generate the one or more interpolated frames.

4. A method comprising:
accessing bandwidth data indicating an amount of bandwidth between a server and a media device;
accessing quality of service data indicating a requested quality of service associated with video content provided to the media device;
accessing a metadata datastore storing a plurality of metadata associated with the video content;
selecting metadata associated with video frames of the video content including transformation data, the metadata based on at least one of the requested quality of service, or the bandwidth data;
storing the metadata in the metadata datastore;

accessing the metadata datastore storing the metadata associated with the video frames of the video content; and providing the metadata to the media device to maintain presentation of the video content by the media device using the metadata including the transformation data that includes information that indicates a transform to apply to a video frame for generation of one or more interpolated frames for adapting transmission of the video content to conditions affecting the presentation of the video content provided to the media device.

5. The method of claim 4, wherein an amount of the plurality of metadata is selected in response to a determination that the amount of bandwidth is greater than or equal to a threshold amount.

6. The method of claim 4, wherein:
the metadata comprises first metadata and second metadata, the first metadata is associated with a first priority and the second metadata is associated with a second priority;
the first metadata is selected in response to a determination that the first priority is higher than the second priority; and
the second metadata is selected in response to a determination that the second priority is higher than the first priority.

7. The method of claim 4, wherein:
the metadata comprises first metadata and second metadata, the first metadata is associated with a first priority and the second metadata is associated with a second priority;
at a first time, the first priority is higher than the second priority;
at a second time, the second priority is higher than the first priority in response to a determination that the amount of bandwidth is less than or equal to a threshold amount; and
the second metadata is selected in response to a determination that the second priority is higher than the first priority.

8. The method of claim 4, further comprising accessing capability data indicative of one or more capabilities of the media device, the metadata comprises first metadata and second metadata, wherein the first metadata is selected in response to a determination that the one or more capabilities include at least one or more predetermined capabilities.

9. The method of claim 4, wherein:
the requested quality of service comprises one of a first quality bitrate stream and a second quality bitrate stream;
the metadata comprises first metadata and second metadata, the first metadata and the second metadata are selected in response to a determination that the requested quality of service comprises the first quality bitrate stream; and
the first metadata is selected in response to a determination that the requested quality of service comprises the second quality bitrate stream.

10. The method of claim 4, further comprising:
generating resource consumption data including a value indicating one or more amounts of one or more resources consumed to perform computational tasks; and
in response to a determination that an amount of resources consumed as indicated by the resource consumption data is greater than a threshold amount of resources consumed:

terminate providing the video content to the media device; and
provide the metadata to the media device.

11. The method of claim 4, further comprising providing the video content to the media device, wherein:
the metadata comprises first metadata and second metadata, the first metadata comprises motion vector data comprising information about motion of one or more objects depicted in the video content; and
the media device uses the motion vector data to generate interpolated frames.

12. The method of claim 4, wherein the metadata comprises first metadata and second metadata, the first metadata comprises the transformation data indicative of the transform to apply to the video frame to generate the one or more interpolated frames, wherein the transform comprises one of a Discrete Cosine Transform ("DCT"), a wavelet transform, and a Karhunen-Loève Transform ("KLT").

13. The method of claim 12, wherein the transform is determined based on the requested quality of service associated with the video content received by the media device.

14. The method of claim 4, wherein the media device is configured to use the metadata to generate interpolated frames in response to a determination that a dependent frame is unavailable for presentation.

15. The method of claim 4, further comprising providing the video content to the media device, wherein the video content is compatible with at least a portion of the MPEG-2 standard promulgated by the Motion Pictures Experts Group ("MPEG") or the H.264 standard developed by the Video Coding Experts Group and the MPEG, wherein the metadata is provided to the media device separate from the video content.

16. The method of claim 4, wherein:
the metadata comprises first metadata and second metadata, the first metadata is selected in response to:
the amount of bandwidth being equal to or greater than a first bandwidth threshold amount; and
the requested quality of service comprising a first requested quality of service;
the second metadata is selected in response to:
the amount of bandwidth being equal to or greater than a second bandwidth threshold amount; and
the requested quality of service comprising a second requested quality of service; and
the first requested quality of service is different from the second requested quality of service.

17. A media device comprising:
a communication interface;
a memory storing computer-executable instructions; and
a processor communicatively coupled to the communication interface and the memory, the processor configured to execute the computer-executable instructions to:
provide capability data to a server, wherein the capability data indicates one or more capabilities of the media device;
provide quality of service data to the server, wherein the quality of service data indicates a requested quality of service associated with video content provided to the media device;
receive metadata comprising information associated with video frames of the video content including transformation data, the metadata based on at least one of the capability data, the bandwidth data, and the requested quality of service;
use the metadata including the transformation data that includes information that indicates a transform to apply to a video frame to generate interpolated frames for adapting to conditions affecting presentation of the video content to maintain the presentation of the video content provided to the media device; and send the interpolated frames for presentation at a display device.

18. The media device of claim 17, wherein:

the metadata comprises first metadata and second metadata, the first metadata comprises scene change data indicating a frame in which a video scene change occurs; and the processor is further configured to execute the computer-executable instructions to use the scene change data to determine whether to generate the interpolated frames.

19. The media device of claim 17, wherein:

the metadata comprises quantization data representative of quantization factors corresponding to coefficients of the transform used to encode the video content; and the processor is further configured to execute the computer-executable instructions to use the quantization data to generate the interpolated frames.

20. The media device of claim 17, wherein:

the metadata comprises first metadata and second metadata, the first metadata comprises motion vector data comprising information about motion of one or more objects depicted in the video content; and the media device uses the motion vector data to generate the interpolated frames.

* * * * *